(12) United States Patent
Satoji et al.

(10) Patent No.: US 7,267,484 B2
(45) Date of Patent: Sep. 11, 2007

(54) FLUID BEARING DEVICE

(75) Inventors: Fuminori Satoji, Mie-ken (JP); Seiji Shimizu, Mie-ken (JP); Kenji Ito, Mie-ken (JP); Isao Komori, Mie-ken (JP); Ryouichi Nakajima, Mie-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/843,672

(22) Filed: May 12, 2004

(65) Prior Publication Data
US 2004/0264817 A1    Dec. 30, 2004

(30) Foreign Application Priority Data
May 13, 2003  (JP) .............................. 2003-134751
Sep. 16, 2003  (JP) .............................. 2003-323092

(51) Int. Cl.
*F16C 17/10*    (2006.01)

(52) U.S. Cl. ...................................... 384/112
(58) Field of Classification Search ................ 384/112, 384/107, 114, 119
See application file for complete search history.

(56) References Cited

U.S. PATENT DOCUMENTS 5,998,898 A * 12/1999 Fukutani et al. ............ 384/114

* cited by examiner

*Primary Examiner*—Lenard A. Footland
(74) *Attorney, Agent, or Firm*—Arent Fox LLP

(57) ABSTRACT

The preset invention aims to improve the assembly accuracy and rotation accuracy of a fluid bearing device, and to further reduce the cost thereof. A bearing sleeve is fixed on the inner periphery of a housing. An axial member is supported in a non-contact manner in a radial direction by an oil film formed in a radial bearing gap. The housing made of resin is injection molded with the use of a substrate as an insert part. On the substrate, a control circuit for controlling a polygon scanner motor is mounted.

7 Claims, 7 Drawing Sheets

FLUID BEARING DEVICE

BACKGROUND OF THE INVENTION

The present invention relates to a fluid bearing device which supports an axial member in a non-contact manner by an oil film of a lubricating oil generated in a radial bearing gap, and a dynamic bearing device (a fluid dynamic bearing device) which supports an axial member in a non-contact manner by the action of dynamic pressure of lubricating oil generated in a radial bearing gap.

These bearing devices are ideal for use in information equipment, including the spindle motors for magnetic disk devices such as HDD and FDD, optical disk devices for CD-ROM, CD-R/RW, DVD-ROM/RAM, etc. and magneto-optical disk devices for MD, MO, etc., the polygon scanner motors in laser beam printers (LBP), color wheels for a projector, or small-scale motors for electrical equipment such as axial flow fans.

Speedup, cost reduction, noise reduction, and the like are required of the foregoing various motors, in addition to high rotation accuracy. One of components to determine required performance is a bearing for supporting a spindle of the motor. In recent years, a fluid bearing having superior characteristics in regard to the foregoing required performance is contemplated using, or actually used.

This type of fluid bearing is broadly divided into a so-called dynamic pressure bearing and a so-called cylindrical bearing (a bearing the bearing surface of which is in the shape of a perfect circle). The dynamic pressure bearing is provided with dynamic pressure generation means which makes a lubricating oil in a bearing gap generate dynamic pressure. The cylindrical bearing is not provided with such dynamic pressure generation means.

Taking the case of a fluid bearing device which is installed in a polygon scanner motor of a laser beam printer (LBP), for example, the fluid bearing device is provided with a radial bearing portion for supporting an axial member in a non-contact manner rotatably in a radial direction, and a thrust bearing portion for supporting the axial member rotatably in a thrust direction. As the radial bearing portion, a dynamic pressure bearing is used, which is provided with a groove (a dynamic pressure generating groove) in the inner peripheral surface of a bearing sleeve or the outer peripheral surface of the axial member to generate dynamic pressure. As the thrust bearing portion, for example, a bearing which supports one end face of the axial member in a contact manner by a thrust plate (a so-called pivot bearing) is used.

In the fluid bearing device, the bearing sleeve is fixed in a predetermined position of the inner periphery of a housing, and a seal member is fixed in an opening of the housing, in order to prevent the lubricating oil in the internal space of the housing from leaking to the outside. On the outer periphery of the housing, a substrate on which electronic components for controlling the motor are mounted is fixed by means of swaging, bonding or the like.

The foregoing fluid bearing device which comprises many parts such as the housing, the bearing sleeve, the axial member, the thrust plate, the seal member, and the like, and an effort is under way to increase the processing accuracy and the assembly accuracy of each part, for the purpose of ensuring high bearing performances, which are required in accordance with further increase in the performance of the information equipment. Demand for cost reduction on this type of fluid bearing device, on the other hand, has increasingly become severe in accordance with drop in the price and size of the information equipment.

SUMMARY OF THE INVENTION

In view of the foregoing, an object of the present invention is to improve the assembly accuracy and the rotation accuracy of a fluid bearing device and a motor, and to further reduce the cost thereof.

To achieve the above object, a fluid bearing device according to the present invention comprises: a housing; a bearing sleeve which is fixed on the housing and supports an axial member in a non-contact manner in a radial direction, by use of an oil film formed in a radial bearing gap between an outer peripheral surface of the axial member and the bearing sleeve itself, when the axial member to be supported rotates; and a base member which fixes the housing. In this fluid bearing device, the housing is a resin injection-molded article in which the base member is used as an insert part (or including an outsert part, same in below).

When the housing is insert molded (or including outsert molding, same in below) of resin, forging and cutting processes, which are necessary when the housing is made of metal material, become unnecessary, so that it is possible to reduce the manufacturing cost of the housing. Since the base member is used as the insert part, the attachment process of the base member to the housing is unnecessary, so that assembly cost is reduced. Furthermore, it is possible to increase the assembly accuracy of the housing and the base member, and obtain high fixing force between them.

Herein, the "base member" refers to a member for fixing the housing in a predetermined position. Taking the case of the fluid bearing device for foregoing various motors, for example, the base member corresponds to a substrate, on which a circuit for controlling the rotation of the motor is mounted. In this case, as described above, the high assembly accuracy between the housing and the base member is ensured by insert molding, so that the fixing accuracy of the housing is improved. Furthermore, it is possible to improve the rotation accuracy of the axial member.

In insert molding the housing, a rotation stopper composed of a recessed portion or a salient portion may be provided in the base member, in order to further increase the fixing force between the housing and the base member.

If the bearing sleeve is used as an insert part too (both of the base member and the bearing sleeve are insert parts), the process of fixing the bearing sleeve on the housing can be omitted, and hence it is possible to further reduce the assembly cost and improve the rotation accuracy.

In a fluid bearing device comprising: a housing; a bearing sleeve which is fixed on the housing and supports an axial member in a non-contact manner in a radial direction, by use of an oil film formed in a radial bearing gap between an outer peripheral surface of the axial member and the bearing sleeve itself, when the axial member to be supported rotates; and a base member (for example, a substrate) which fixes the housing, when the housing is made of resin, and the resin housing is fixed to the base member by welding, effects similar to the foregoing ones can be obtained.

It is preferable that ultrasonic welding is used in this welding. As resin suitable for the ultrasonic welding, amorphous resin such as polysulfone (polyethersulfone, polyphenylsulfone, and the like), polyetherimide and the like, and crystalline resin such as polyamide, PBT, PET, POM, LCP, and the like are preferable in consideration of oil resistance. When the resin is compounded with a filler, in consideration of strength and a coefficient of linear expansion, it is preferable that a percentage of the contained filler is equal to or less than 30 vol %.

In either case of the insert molding and the welding, the fine fixing accuracy of the housing is ensured by regulating the squareness between the base member and an axis of the housing equal to or less than 20 µm, and hence the rotation accuracy can be improved. Especially in the case of the welding, it is possible to achieve the squareness in the foregoing range by simultaneously carrying out the process of fixing the bearing sleeve on the inner periphery of the housing, and the welding process between the housing and the base member.

In either case of the insert molding and the welding, it is preferable that the dynamic pressure generation means such as a dynamic pressure generating groove and the like generates pressure (oil film pressure) in the radial bearing gap, by use of the dynamic pressure action of the lubricating oil. In this case, since the rigidity of the bearing is increased, it is possible to obtain favorable rotation accuracy.

Composing a motor out of the foregoing fluid bearing device, a rotor attached to the axial member, and a stator attached to the housing, it is possible to provide a motor (a spindle motor, a polygon scanner motor, and other small-sized motors) suitable for the foregoing information equipment.

According to the present invention, as described above, it is possible to efficiently and inexpensively assemble the substrate and the housing, so that the cost of the fluid bearing device is further reduced. Since favorable assembly accuracy is secured between the substrate and the housing, the rotation accuracy of the motor can be improved. Furthermore, high fixing force is secured between them, so that it is possible to stably maintain initial rotation accuracy for a long time, even under a severe working condition with a load such as an impact load and the like.

To achieve the above object, a dynamic bearing device according to the present invention comprises a housing, a bearing sleeve fixed on the inside of the housing, and an axial member which is inserted into the inner periphery of the bearing sleeve and rotates relatively to the bearing sleeve. When the axial member rotates, the bearing sleeve supports the axial member in a non-contact manner in a radial direction, by use of dynamic pressure action of a lubricating oil generated in a radial bearing gap between the inner peripheral surface of the bearing sleeve and the outer peripheral surface of the axial member. The dynamic bearing device further comprises a bracket which is disposed on the outer periphery of the housing and has an attachment portion for a motor stator. At least one of the housing and the bracket is made of resin, and the housing and the bracket are integrally molded.

In the conventional dynamic bearing device, both of the housing and the bracket are made of metal, and hence they are tightly bonded to each other by an adhesive. In recent years, however, it is considered to mold the housing of resin, from the viewpoint of cost reduction and the like. In the case of using the resin housing like this, the bond strength between the resin and the metal is conspicuously inferior to that between metals. Thus, it is difficult to obtain a sufficient adhesive force between the resin housing and a metal bracket. Extra measures, those are, increase in a bond area and the like become necessary. There is a case that the surface of resin is subjected to primer processing to secure the adhesive force. In this case, however, the number of bond processes is increased.

When at least one of the housing and the bracket is made of resin, and the housing and the bracket are integrally molded, as described above, the measures to increase the adhesive force become unnecessary. Therefore, it is possible to reduce the cost of the motor, due to reduction in the number of bond processes and parts. Since such an integrally-molded resin article can be accurately molded by use of a mold, increasing the accuracy of the molded article makes it possible to improve the rotation accuracy of the motor.

As a method for molding the housing and the bracket into one unit, there is a method in which, for example, both of the housing and the bracket are made of resin, and are integrally molded. In this case, since a housing/bracket interface does not exist in an integrally-molded article, the bond strength between them does not become a problem, and the mechanical strength of the resin material is sufficient. Therefore, necessary strength is secured only by selecting a proper resin material.

As another method for molding the housing and the bracket into one unit, there is a method in which, for example, one of the housing and the bracket is made of resin, and the other is made of metal, and the one of the housing and the bracket is injection-molded with the other part used as an insert part. Effect similar to the above can be obtained in this case.

As the specific structure of the dynamic bearing device, it is conceivable that a thrust bearing gap is formed between the housing and the axial member, and the axial member is supported in a non-contact manner in a thrust direction, by use of dynamic pressure action of the lubricating oil generated in the thrust bearing gap (refer to FIGS. 5 and 6).

As another specific structure of the dynamic bearing device, it is conceivable that the axial member is supported in a contact manner in the thrust direction, by the contact of the axial member with a stational member (refer to FIG. 9). The stational member, which makes contact with the axial member, may be, for example, a bottom portion of the housing, when the housing is formed in the shape of a cylinder with a bottom. Besides, the stational member may be a thrust plate, which is disposed on the bottom portion of the housing.

Composing a motor out of the foregoing dynamic bearing device, a motor rotor, and a motor stator which generates exciting force with the motor rotor, it is possible to provide a motor with high rotation accuracy at low cost.

According to the dynamic bearing device of the present invention, as described above, it is possible to provide a motor with high rotation accuracy at low cost.

DESCRIPTION OF THE PREFERRED EMBODIMENTS

Embodiments of the present invention will be hereinafter described.

Figure 1:
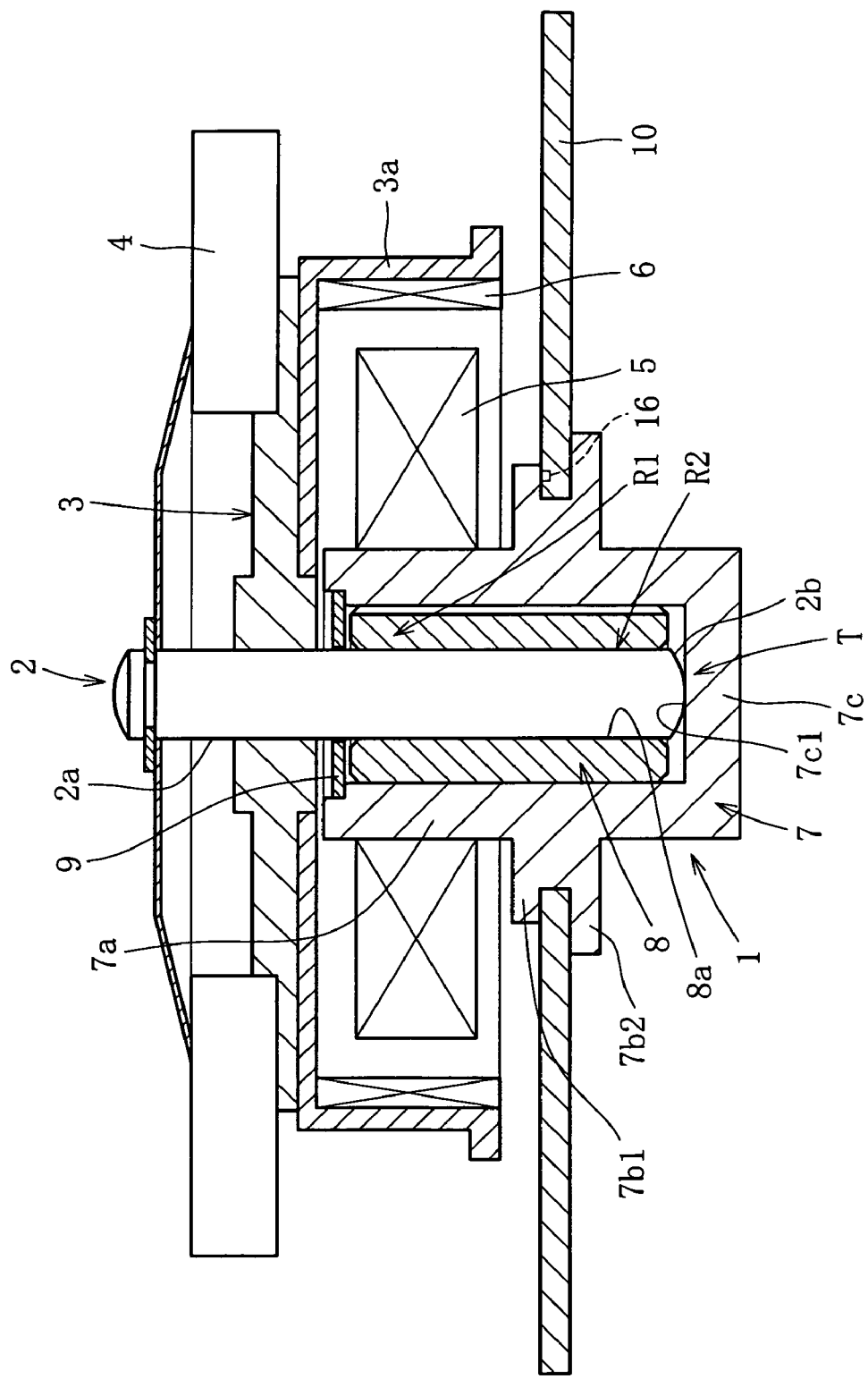
FIG. 1 is a sectional view of a polygon scanner motor in which a fluid bearing device according to the present invention is installed.

FIG. 1 shows a polygon scanner motor as an example of a motor in which a fluid bearing device (a fluid dynamic bearing device) is installed. This motor is provided with a fluid bearing device 1 for rotatably supporting an axial member 2 in a non-contact manner, a rotating member 3 attached to the axial member 2, a polygon mirror 4 fixed on the rotating member, and a motor stator (stator coil) 5 and a motor rotor (rotor magnet) 6 which are opposite to each other across a gap in a radial direction. The stator 5 is attached to the outer periphery of a housing 7 of the fluid bearing device 1, and the rotor 6 is attached to the inner periphery of a cylindrical section 3a of the rotating member 3. When the stator 5 is energized, exciting force generated between the stator 5 and the rotor 6 rotates the rotor 6. Thus, the rotating member 3, the axial member 2, and the polygon mirror 4 are integrally rotated with the rotor 6. A substrate 10 as a base member, on which electronic components are mounted, is disposed on the outer periphery of the housing 7. A control circuit mounted on the substrate 10 controls the drive of the motor.

The fluid bearing device 1 mainly comprises the housing 7, a bearing sleeve 8 fixed on the inner periphery of the housing 7, and the axial member 2 inserted into the inner periphery of the bearing sleeve.

The axial member 2 is made of metal material such as stainless steel and the like, and one end thereof is formed in the shape of a convex sphere. In a state that the axial member 2 is inserted into the inner periphery of the bearing sleeve 8, a first radial bearing portion R1 and a second radial bearing portion R2 are separately provided in an axial direction between the inner peripheral surface 8a of the bearing sleeve 8 and the outer peripheral surface 2a of the axial member 2. Also, a thrust bearing portion T is provided between a convexly spherical lower end face 2b of the axial member 2 and an inner bottom face 7c1 of a bottom portion 7c of the housing 7. For the convenience of explanation, the side of the thrust bearing portion T is referred to as a lower side, and a side opposite to the thrust bearing portion T is referred to as an upper side in explanation below.

The bearing sleeve 8, which is made of porous material composed of sintered metal, is formed in a cylindrical shape. The principal material of the sintered metal is one or more type(s) of metal powder selected from, for example, copper, iron and aluminum, metal powder subjected to coating processing such as iron powder coated with copper, or alloy powder. The principal material is mixed with powder or alloy power of tin, zinc, lead, graphite, molybdenum disulfide and the like as necessary, and then is molded and sintered to be used as the sintered metal. The sintered metal like this has many pores (pores as internal tissues) in the inside, and also has many openings which are formed by the pores open to an outside face. The sintered metal is used as oil-impregnated sintered metal with which the lubricating oil or lubricating grease is impregnated. The bearing sleeve 8 may be made of other metal material such as soft metal and the like, instead of the sintered metal.

Figure 2:
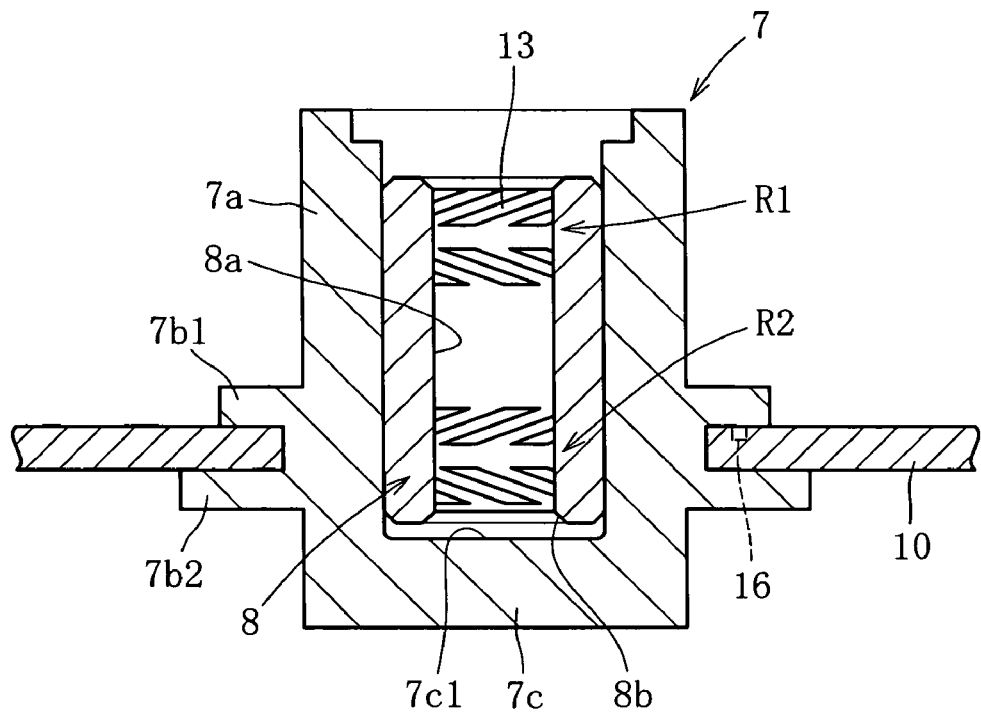
FIG. 2 is a sectional view of an insert-molded housing and a substrate.

Referring to FIG. 2, two regions as radial bearing surfaces are separately provided in the inner peripheral surface 8a of the bearing sleeve 8 on the upper and lower sides in the axial direction. In each of the two regions, for example, dynamic pressure generating grooves 13 in the shape of a herringbone are formed as dynamic pressure generation means. Grooves in the shape of a spiral or in the axial direction may be formed as the dynamic pressure generation means. A bearing with three arcs or the like may be adopted instead.

When the axial member 2 rotates, each of the regions (the two upper and lower regions), being the radial bearing surfaces in the inner peripheral surface 8a of the bearing sleeve 8, is opposed to the outer peripheral surface 2a of the axial member 2 across a radial bearing gap. In accordance with the rotation of the axial member 2, the dynamic pressure action of the lubricating oil is generated in the foregoing radial bearing gap. An oil film of the lubricating oil formed in the foregoing radial bearing gap supports the axial member 2 in a non-contact manner rotatably in the radial direction. Thus, the first radial bearing portion R1 and the second radial bearing portion R2 are configured so as to support the axial member 2 rotatably in the radial direction in a non-contact manner. At the same time, the lower end face 2b of the axial member 2 is supported by the inner bottom face 7c1 of the housing 7 in a contact manner. Thus, the thrust bearing portion T is configured so as to support the axial member 2 rotatably in a thrust direction.

The housing 7 is made of resin such as nylon 66 and the like by molding (for example, injection molding), with the use of the substrate 10 as an insert part. The housing 7 is formed in the shape of a cylinder with a bottom, and one end of the housing 7 is open and the other end thereof is closed. The housing 7 is provided with a cylindrical side portion 7a, flange-shaped protruding portions 7b1 and 7b2 formed on the outer periphery of the side portion 7a, and a bottom portion 7c integrally formed in the lower end of the side portion 7a. An edge (inner edge in the drawings) of the substrate 10 is embedded between the two protruding portions 7b1 and 7b2 apart from each other in the axial direction by insert molding, in order to integrate the housing 7 and the substrate 10.

By insert molding the substrate 10 and the housing 7, as described above, the substrate 10 is assembled in the housing 7 concurrently with the molding of the housing 7. Thus, the simplification of an assembly process brings about reduction in assembly cost. Also, the reference surface (for example, inner peripheral surface) of the housing 7 and the substrate 10 are accurately positioned with a mold in insert molding, so that it is possible to secure the high assembly accuracy between the housing 7 and the substrate 10 even after the insert molding. To be more specific, it is possible to make the squareness between an axis of the housing 7 and substrate 10 equal to or less than 20 µm. If the squareness is larger than 20 µm, the squareness between the substrate 10 and the inner peripheral surface of the bearing sleeve also decreases, and hence the assembly accuracy and the rotation accuracy of the motor are out of the allowable range.

Since the substrate 10 is integrated with the housing 7, in the state of being bound from both sides in the axial direction by the protruding portions 7b1 and 7b2 of the housing, it is possible to obtain high fixing force. Therefore, the assembly accuracy between the housing 7 and the substrate 10 does not decrease even with vibration and impact, so that it is possible to stably maintain the high assembly accuracy for a long time.

It is preferable, as shown by broken lines on the right side in FIG. 2, to provide a recessed portion 16 in the substrate 10, in order to further strengthen the fixing force. The resin is injected into the recessed portion 16 too in insert molding, so that the substrate 10 and the housing 7 are engaged in a circumferential direction with a bump and a dent. In this case, the substrate 10 is prevented from turning. The recessed portion 16 may be formed in a contact portion with the resin, on the inner radial side of the substrate 10. The shape of a hole, a groove or a notch is considered as the shape of the recessed portion 16. The same effect is obtained, when a salient portion (in the shape of a projection or a protrusion) is provided in the substrate 10, and the salient portion is embedded in the housing 7 by the insert molding.

After the insert molding, the bearing sleeve 8 is fixed on the inner periphery of the housing 7 by means of press fitting, bonding or the like, and the seal member 9 is fixed on the inner periphery of the opening of the housing 7 by similar fixing means. Then, for example, the lubricating oil is charged into the inside of the bearing sleeve 8, and then the axial member 2 is inserted in such a manner that the lower end face 2b thereof makes contact with the inner bottom face 7c1 of the housing 7. Therefore, it is possible to assemble the fluid bearing device integrally having the substrate 10.

The assembled fluid bearing device is installed in a laser beam printer, by means of attaching the substrate 10 to a motor casing (not illustrate) or the like. In this case, since the high assembly accuracy is secured between the substrate 10 and the housing 7, as described above, it is possible to obtain high rotation accuracy even after the installation in the printer. Therefore, the fluid bearing device is applicable to recent increase in speed and printing accuracy of a printer.

Figure 3:
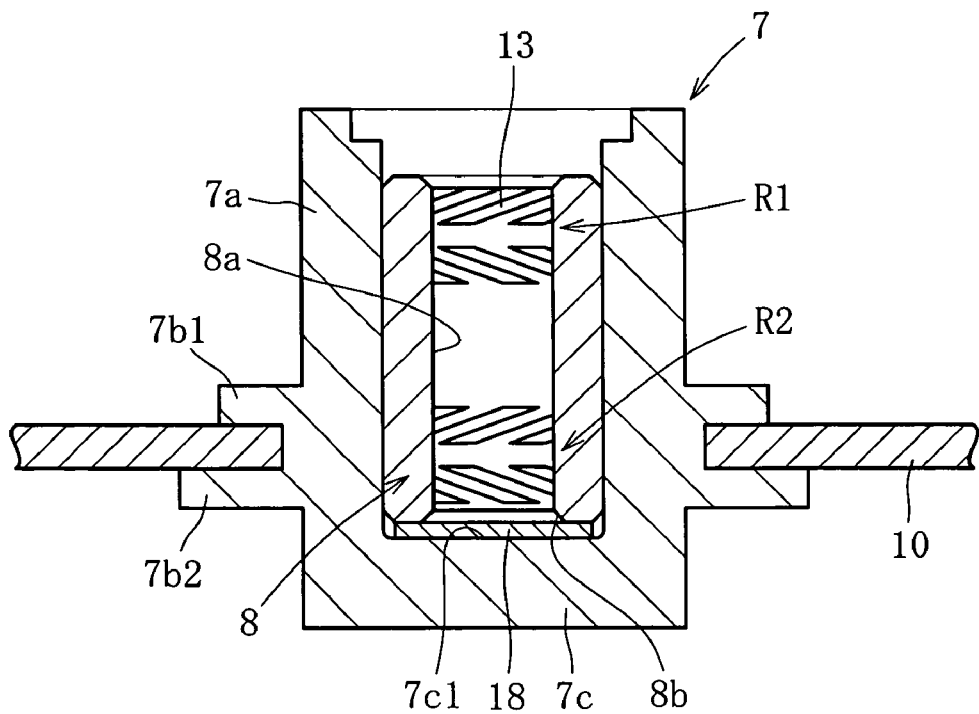
FIG. 3 is a sectional view of an insert-molded housing and a substrate according to another embodiment.

The lower end face 2b of the axial member 2, as described above, is formed in the shape of a convex sphere. Thus, when the convex spherical portion is opposed to the region of the dynamic pressure generating grooves 13, the width of the bearing gap becomes wide, and hence the dynamic pressure action is adversely affected. To prevent such a situation, as shown in FIGS. 2 and 3, it is preferable that, of the two radial bearing portions R1 and R2, the lower region of the dynamic pressure generating groove 13 in the radial bearing portion R2 is apart from a chamfer 8b in the inner periphery of the lower end of the bearing sleeve 8, in order to make the whole regions of the dynamic pressure generating grooves opposed to the cylindrical portion of the axial member 2. From the same viewpoint, as shown in the drawings, it is preferable that a gap is left between the lower end face of the bearing sleeve 8 and the inner bottom face 7c1 of the housing, when fixing the bearing sleeve 8 on the inner periphery of the housing 7.

FIG. 3 shows another embodiment of the present invention. In FIG. 3, a thrust bearing 18 separate from a housing 7 is disposed in the inner bottom face 7c1 of the housing 7. The lower end face 2b of an axial member 2 makes contact with the thrust bearing 18, to configure a thrust bearing portion T. According to this structure, the thrust bearing 18 is made of resin material superior in sliding performance. The housing 7, however, can be made of other resin material cheaper than that of the thrust bearing 18, so that it is possible to further reduce cost.

In insert molding, only the substrate 10 may be used as an insert part. Otherwise, both of the substrate 10 and the bearing sleeve 8 may be used as insert parts. Therefore, since the assembly process of the bearing sleeve 8 also becomes unnecessary, in addition to that of the substrate 10, it is possible to further reduce assembly cost. Also the positioning accuracy of the bearing sleeve 8 and the substrate 10 can be further improved. In this case, a portion (extending portion) extending on the side of an inner diameter may be provided in the upper end opening of the housing 7, and a seal gap may be formed between the inner peripheral surface of the extending portion and the outer peripheral surface of the axial member 2. The foregoing structure corresponds to structure that the seal member 9 and the housing 8 are integrated in the fluid bearing device shown in FIG. 1. Thus, since the seal member 9 and the assembly process thereof become unnecessary, it is possible to further reduce cost.

When the bearing sleeve 8 is used as the insert part, as described above, molding pressure is also applied to the bearing sleeve 8, and hence there is a possibility that the effect of the molding pressure causes decrease in the accuracy of the dynamic pressure generating grooves 13. Thus, when the molding pressure becomes a problem, it is preferable that the bearing sleeve 8 is press fitted and fixed in the inner periphery of the housing after the insert molding, as described above, instead of using the bearing sleeve 8 as the insert part.

Figure 4:
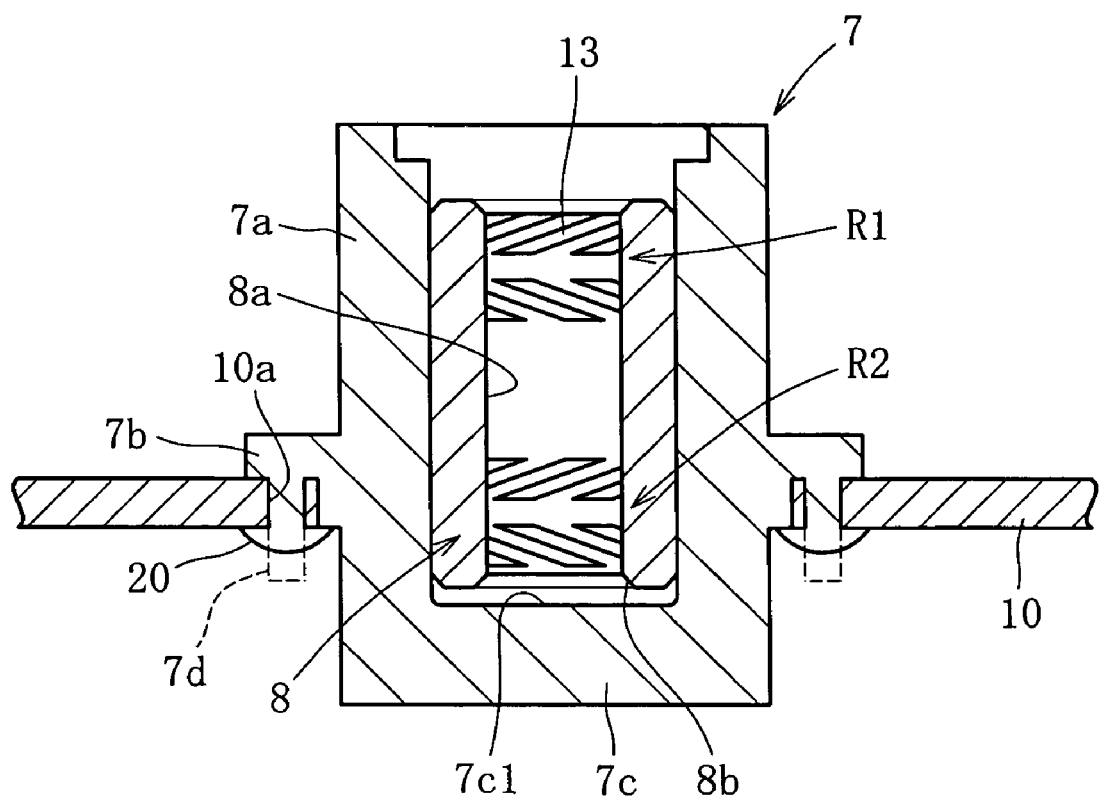
FIG. 4 is a sectional view of the housing and the substrate which are fixed by welding.

FIG. 4 shows further another embodiment of the present invention. In this embodiment, a housing 7 and a substrate 10 are fixed by welding. FIG. 4 shows the case of adopting welding means called staking.

In this embodiment, the housing 7 is molded separately from the substrate 10 by molding means such as injection molding or the like. At this time, a flange-shaped protruding portion 7b, protruding on the side of an outer diameter, is formed on the outer periphery of the side portion 7a, and projections 7d shown in broken lines are formed in the protruding portion 7b.

In welding process, the projections 7d are inserted into holes 10a formed in the substrate 10 in advance. Then, an end portion of the projection 7d protruding from the substrate 10 is pressed and softened, to form a flange-shaped head section 20 (shown in solid lines) and weld the head section 20 to the substrate 10. In welding the head section, as in the case of the foregoing insert molding, it is possible to obtain proper assembly accuracy and fixing force at low cost. The welding process is broadly divided into high-frequency welding, heat welding, ultrasonic welding and the like in general, and the present invention can adopt any of them. In the case of a motor for information equipment such as a polygon scanner motor and the like, the ultrasonic welding is the most preferable, in consideration of an ultra-compact bearing device (the axial diameter thereof is equal to or less than approximately 3 mm), the detrimental effect of heat on the substrate, and cost.

The bearing sleeve 8 is press fitted or bonded in the inner periphery of the housing 7, irrespective of before or after the foregoing welding process. If a fixing process is carried out concurrently with the welding process, however, it is possible to attach the substrate 10 with respect to the inner peripheral surface 8a of the bearing sleeve 8. Thus, the squareness between the substrate 10 and the inner peripheral surface 8a of the bearing sleeve is easily adjusted to a predetermined value (equal to or less than 20 μm), and hence it is possible to ensure fine rotation accuracy.

The other structure, effect, operation procedure, modification examples, and the like are the same as those in the case of the insert molding, duplicate explanation is omitted.

In the foregoing embodiments, a pivot bearing for supporting the end portion of the axial member 2 in a contact manner is used in the thrust bearing portion T, but a dynamic pressure bearing may be used in the thrust bearing portion T. In the dynamic pressure bearing, similarly to the radial bearing portions R1 and R2, dynamic pressure generation means such as dynamic pressure generating grooves generates pressure by the effect of dynamic pressure of the lubricating oil generated in a bearing gap, to support an axial member 2 in a non-contact manner in a thrust direction.

The present invention is also applicable to a fluid bearing device in which one or both of the radial bearing portions R1 and R2 are composed of so-called cylindrical bearings. The cylindrical bearing is not provided with dynamic pressure generation means.

The range of application of the present invention is not limited to the foregoing polygon scanner motor, as a matter of course, and the present invention is usable as a bearing portion of a spindle motor for a disk drive device such as, for example, a HDD and the like.

Figure 5:
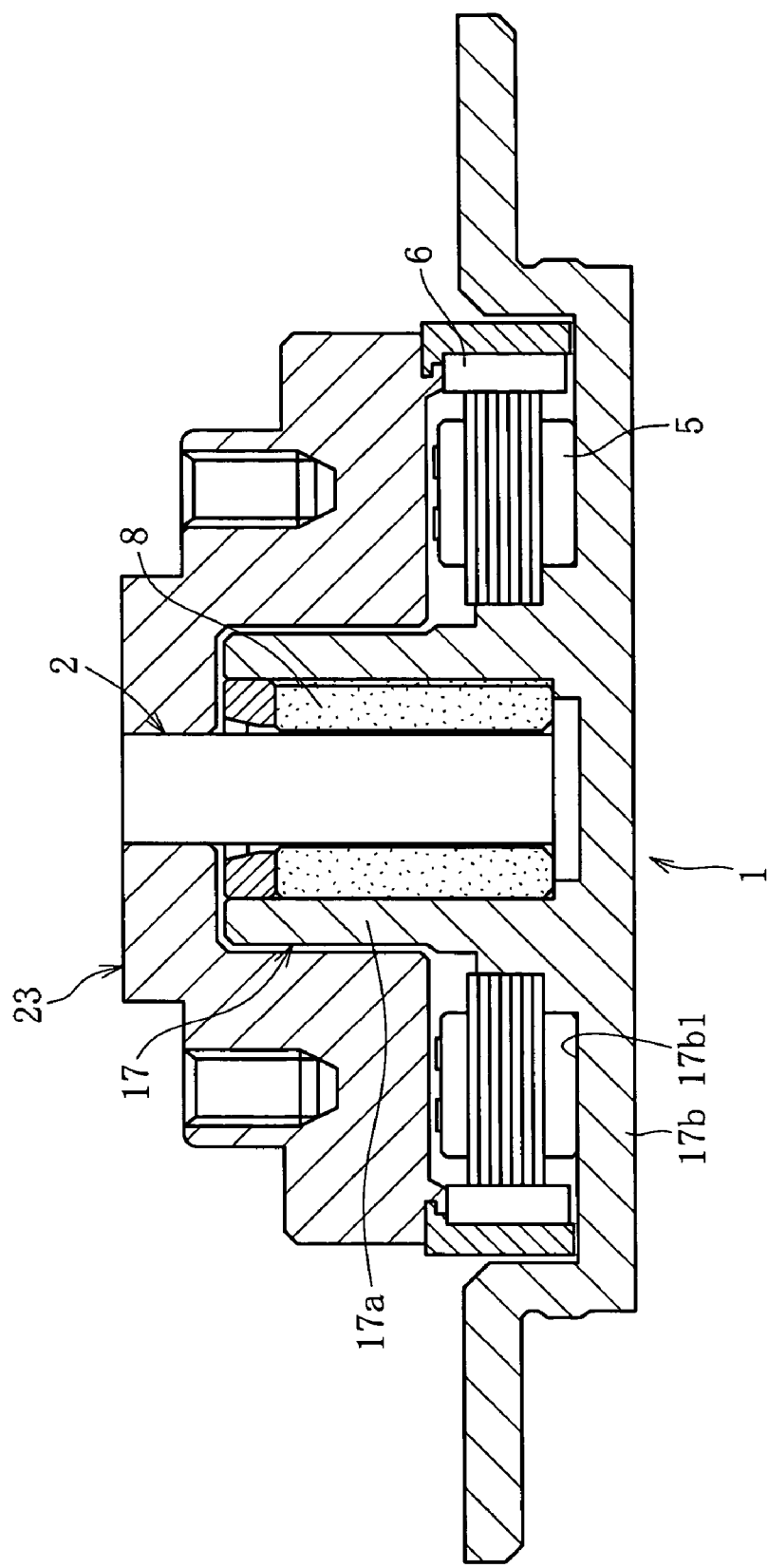
FIG. 5 is a sectional view of a spindle motor for information equipment, in which a dynamic bearing device according to the present invention is installed.

FIG. 5 schematically shows a configuration example of a spindle motor for information equipment, in which a dynamic bearing device 1 is installed. The spindle motor for the information equipment is used in a disk drive device such as a HDD and the like. The spindle motor comprises a dynamic bearing device 1 for rotatably supporting an axial member 2 in a non-contact manner, a disk hub 23 secured to the axial member 2, and a motor stator (stator coil) 5 and a motor rotor (rotor magnet) 6 opposite to each other across, for example, a gap in a radial direction. The motor stator 5 is attached to the outer periphery of the dynamic bearing device 1, and the motor rotor 6 is attached to the inner periphery of the disk hub 23. The disk hub 23 can hold one or more disks, such as a magnetic disk and the like, in its outer periphery. In this spindle motor for the information equipment, when the motor stator 5 is energized, the motor rotor 6 is rotated by exciting force generated between the motor stator 5 and the motor rotor 6. The disk hub 23 and the axial member 2 are integrally rotated in accordance with the rotation of the motor rotor 6.

Figure 6:
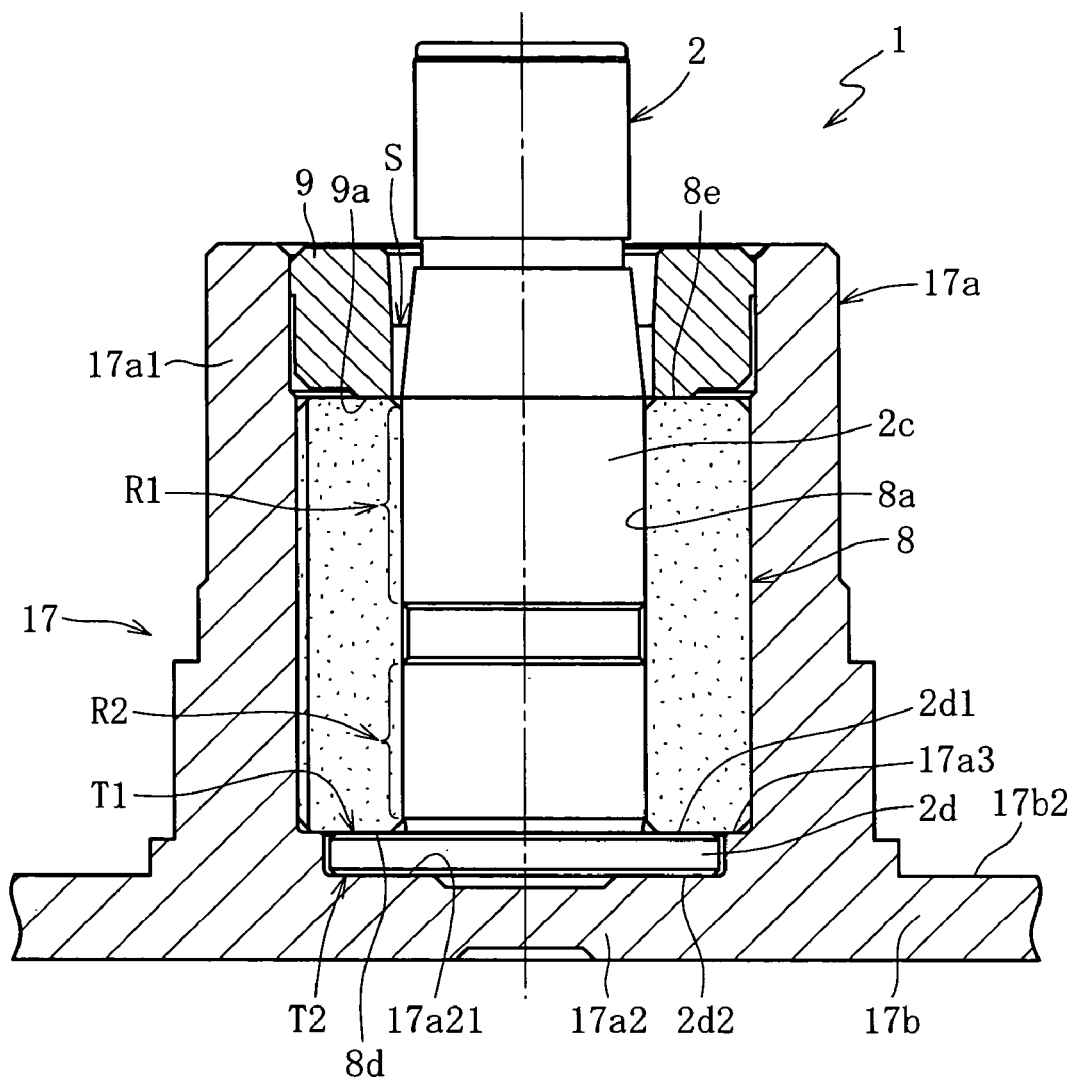
FIG. 6 is a sectional view of the dynamic bearing device.

FIG. 6 shows the dynamic bearing device 1. The dynamic bearing device 1 mainly comprises the axial member 2, a bearing sleeve 8 and a base member 17. The axial member 2 is inserted into the inner periphery of the bearing sleeve 8. The base member 17 has a bottom portion 17a2 in its center. For the convenience of explanation, the side of the bottom portion 17a2 of the base member 17 is referred to as a lower side, and a side opposite to the bottom portion 17a2 is referred to as an upper side in explanation below.

The axial member 2 is made of metal material, such as, for example, stainless steel and the like. The axial member 2 is provided with an axial part 2c, and a flange portion 2d which is integrally or separately formed in a lower end of the axial part 2c.

Figure 7A:
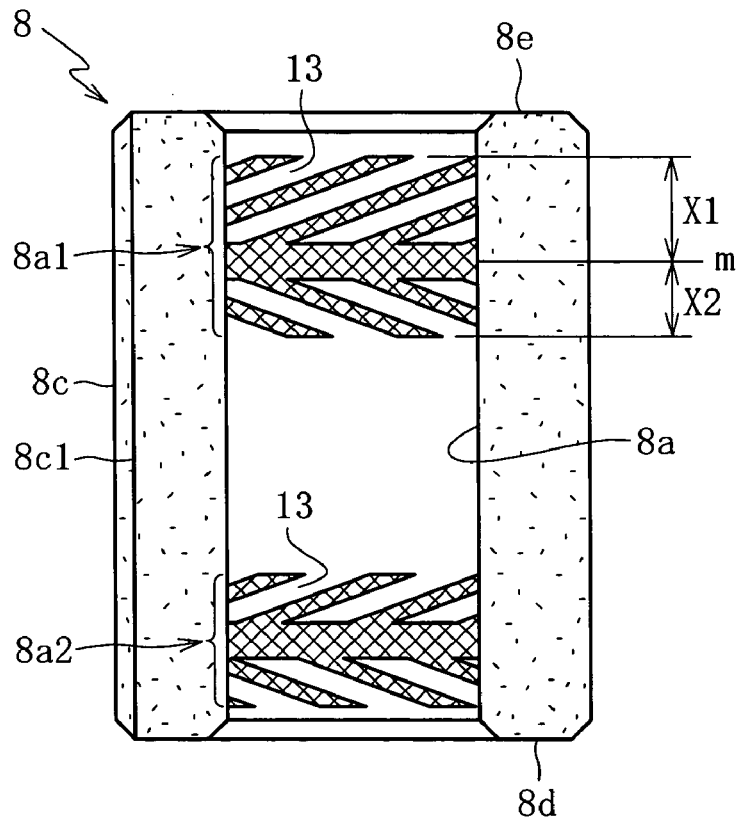
FIG. 7a is a sectional view of a bearing sleeve.

The bearing sleeve 8, formed in a cylindrical shape, is made of porous material composed of, for example, sintered metal. The bearing sleeve 8 is especially made of porous material of sintered metal with copper as a main ingredient. In the inner peripheral surface 6a of the bearing sleeve 8, as shown in FIG. 7a, two radial bearing surfaces 8a1 and 8a2 are separately provided on the upper and lower sides in the axial direction. The radial bearing surfaces 8a1 and 8a2 are opposed to the outer peripheral surface 2a of the axial part of the axial member 2 to be supported, across a radial bearing gap. In each of the radial bearing surfaces 8a1 and 8a2, dynamic pressure generating grooves 13 in the shape of, for example, a herringbone are formed. The upper dynamic pressure generating groove 13 is formed asymmetrically in the axial direction, with respect to an axial center m (the axial center of the region between upper and lower inclined grooves). An axial dimension X1 of a region upper to the axial center m is larger than an axial dimension X2 of a lower region. One or more axial groove 8c1 are formed in the outer peripheral surface 8c of the bearing sleeve 8 over the whole length in the axial direction. In this embodiment, the three axial grooves 8c1 are formed at regular intervals in a circumferential direction.

Figure 7B:
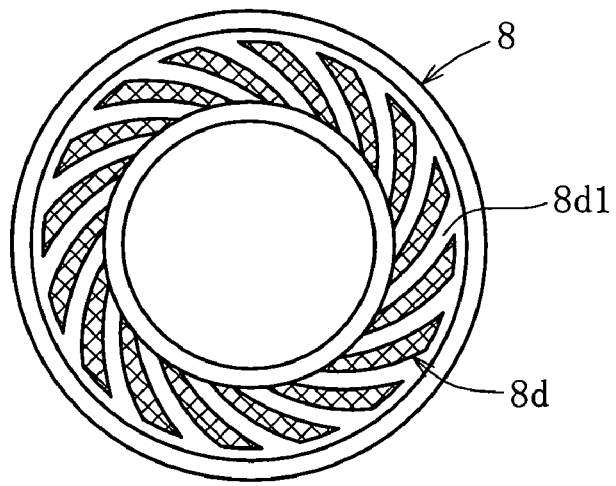
FIG. 7b is a plan view showing a lower end face of the bearing sleeve.

Dynamic pressure generating grooves 8d1 in the shape of, for example, a spiral are formed in the lower end face 8d of the bearing sleeve 8, as shown in FIG. 7b.

The base member 17 comprises a housing 17a in the shape of a cylinder with a bottom, and a flange-shaped bracket 17b extending from a lower end of the housing 17a on the side of an outer diameter. By injection molding a thermoplastic resin composition, for example, nylon 66, LCP, or the like containing reinforcements such as glass fiber and the like, this base member 17 is molded into one unit without the interface between the housing 17a and the bracket 17b.

Figure 8:
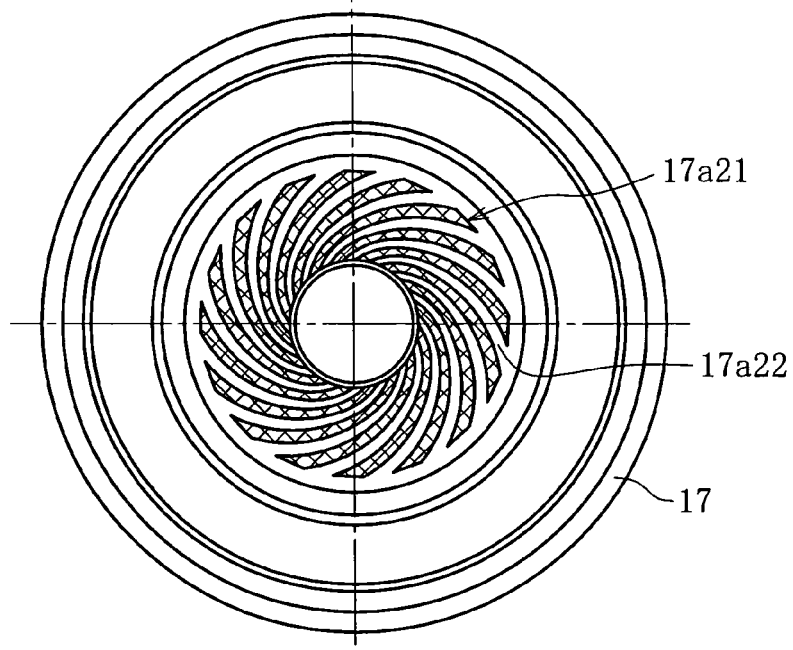
FIG. 8 is a top view of a base member.

The housing 17a comprises a cylindrical side portion 17a1, and a bottom portion 17a2 integrally provided in a lower end of the side portion 17a1. In the inner bottom face 17a21 of the bottom portion 17a2, as shown in FIG. 8, dynamic pressure generating grooves 17a22 in the shape of, for example, a spiral are formed. A stepped portion 17a3 is integrally formed in a position a predetermined distance apart from the inner bottom face 17a21 upward in the axial direction.

The bracket 17b is provided with an attachment portion 17b1 of the motor stator 5. The attachment portion 17b1 is formed in, for example, the top face of bracket 17b, as shown in the drawing. The motor stator 5 is attached to the attachment portion 17b1 by fixing means, such as ultrasonic staking and the like.

The axial member 2 and the bearing sleeve 8 are inserted into the inner periphery of the housing 17a composing the base member 17 so that the lower end face 8d of the bearing sleeve 8 makes contact with the stepped portion 17a3 of the housing 17a. After the axial position of the bearing sleeve 8 with respect to the housing 17a is determined, the bearing sleeve 8 is fixed on the housing 17a by fixing means such as, for example, ultrasonic welding and the like. Then, the seal member 9 is disposed on the inner periphery of an upper end portion of the side portion 17a1 of the housing 17a. The seal member 9 is fixed on the housing 17a, in such a position that the lower end face 9a of the seal member 9 makes contact with the upper end face 8e of the bearing sleeve 8. Then, the assembly of the dynamic bearing device 1 is completed. At this time, the internal space of the housing 17a tightly sealed by the seal member 9 is filled with lubricating oil. The internal space of the housing 17a includes internal pores of the bearing sleeve 8. The oil level of the lubricating oil is maintained in a range of seal space S, which is partitioned by the inner peripheral surface of the seal member 9 and the outer peripheral surface of the axial part 2a of the axial member 2.

In rotating the axial member 2, the viscosity pumpability of the dynamic pressure generating grooves 13, formed in the radial bearing surfaces 8a1 and 8a2, generates the dynamic pressure action of lubricating oil. Thereby, the axial member 2 is supported rotatably in a radial direction in a non-contact manner by an oil film of the lubricating oil formed in the foregoing radial bearing gap. Thus, the first radial bearing portion R1 and the second radial bearing portion R2 are composed to support the axial member 2 rotatably in the radial direction in a non-contact manner.

The first thrust bearing gap is formed between the lower end face 8d of the bearing sleeve 8 and the upper end face 2d1 of the flange portion 2d of the axial member 2. The second thrust bearing gap is formed between the inner bottom face 17a21 of the bottom portion 17a2 of the housing 17a and the lower end face 2d2 of the flange portion 2d of the axial member 2. The dynamic pressure action of the lubricating oil is generated in accordance with the rotation of the axial member 2, by the viscosity pumpability of the dynamic pressure generating grooves 8$d$1 formed in the lower end face 8$d$ of the bearing sleeve 8 and the dynamic pressure generating grooves 17$a$22 formed in the inner bottom face 17$a$21 of the housing 17$a$. Thus, since the oil film of the lubricating oil formed in each of the foregoing two thrust bearing gaps supports the axial member 2 rotatably in a thrust direction in a non-contact manner. The first and second thrust bearing portions T1 and T2 are composed to support the axial member 2 rotatably in the thrust direction in a non-contact manner.

In the present invention, as described above, the housing 17$a$ for holding the bearing sleeve 8 and the bracket 17$b$ being the attachment base for the motor stator 5 are molded at the same time into one unit without any interface, by molding such as injection molding and the like. Thus, it is unnecessary to bond and fix the housing 17$a$ and the bracket 17$b$. Also, measures against decrease in adhesive force, which is necessary when the resin housing 17$a$ is molded, becomes unnecessary. Therefore, it is possible to reduce the cost of a motor, due to reduction in the number of bond processes and parts. Furthermore, since the adhesive force between the housing 17$a$ and the bracket 17$b$ can be evaluated by the mechanical strength of resin material, the design of a bearing becomes easy.

Using an accurate mold makes it possible to easily increase the accuracy of the base member 17, so that it is possible to provide a motor having high rotation accuracy with less fluctuating rotation and the like. Furthermore, the motor is light in weight as compared with a conventional motor, in which both of the housing 17$a$ and the bracket 17$b$ are molded by machined metal material, and also machining cost is reduced.

In the foregoing description, both of the housing 17$a$ and the bracket 17$b$ are made of resin, and integrally molded. One of the housing 17$a$ and the bracket 17$b$, however, may be made of metal such as brass and the like. In this case, of the housing 17$a$ and the bracket 17$b$, a resin part is insert molded with the use of a metal part as an insert part. Thus, both parts can be integrally molded, and hence it is possible to obtain effect similar to above.

If a pattern for grooves corresponding to the dynamic pressure generating grooves 17$a$22 is machined in a portion, corresponding to the thrust bearing surface, of a mold for the base member 17, it is possible to mold the dynamic pressure generating grooves 17$a$22 in the inner bottom face 17$a$21 of the housing 17$a$, concurrently with molding the housing 17$a$. Therefore, it is possible to further reduce cost, as compared with the case of separately molding the dynamic pressure generating grooves of the thrust bearing surface. The dynamic pressure generating grooves 8$d$1 and 17$a$22, formed in the lower end face 8$d$ of the bearing sleeve 8 and in the inner bottom face 17$a$21 of the housing 17$a$, may be formed in both end faces of the flange portion 2$d$ of the axial member 2 instead.

Figure 9:
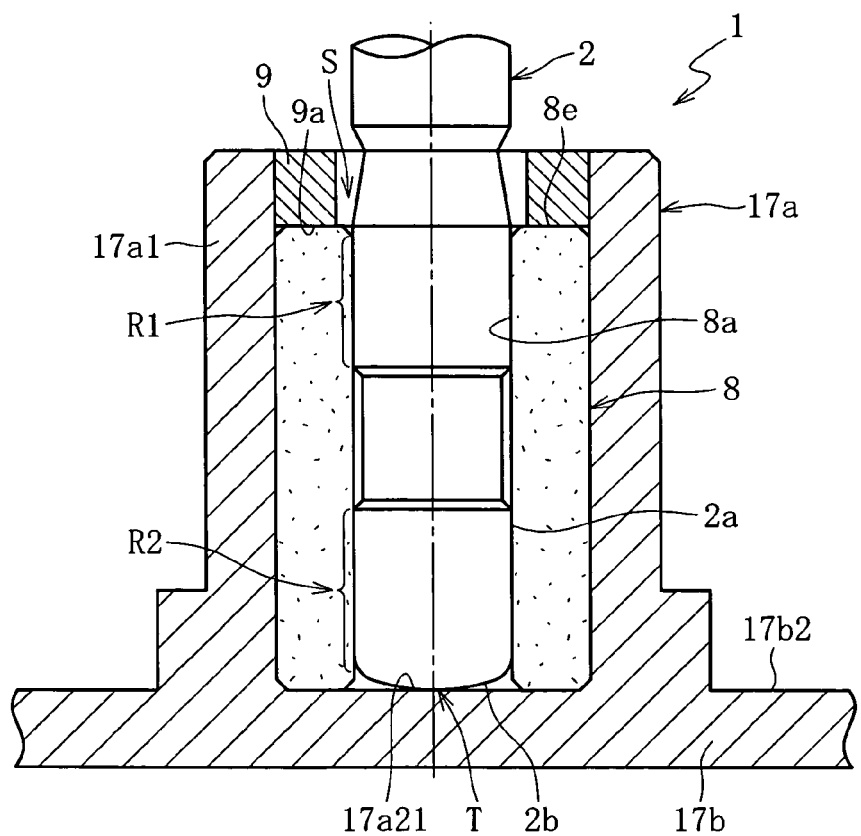
FIG. 9 is a sectional view of a dynamic bearing device.

FIG. 9 is an enlarged sectional view of a spindle motor for information equipment, in which another dynamic bearing device 1 is installed. This embodiment differs from the embodiment of FIG. 6, in the way that a contact type of pivot bearing is used in a thrust bearing portion instead of the non-contact type of dynamic pressure bearing. To be more specific, an axial member 2 is formed in the shape of a rod without a flange portion, and the lower end face 2$b$ thereof is formed in the shape of a convex sphere. The axial member 2 is supported in a contact manner in a thrust direction, in a state that the lower end face 2$b$ pivotally makes contact with the inner bottom face 17$a$2 of a housing 17$a$. Since the other structure is the same as that of the dynamic bearing device shown in FIG. 6, the same reference numerals refer to parts identical to those of the foregoing embodiments, and duplicate explanation is omitted.

Also in this embodiment, at least one of the housing 17$a$ and a bracket 17$b$ is made of resin, and both of them are integrally molded. Therefore, as in the case of the first embodiment, it is possible to realize the cost reduction of a motor, increase in the rotation accuracy thereof and the like.

The invention claimed is:

1. A fluid bearing device comprising:
 an axial member;
 a housing having a side portion and a bottom portion;
 a bearing sleeve which is fixed on the housing and supports the axial member in a non-contact manner in a radial direction, by use of an oil film formed in a radial bearing gap defined between an outer peripheral surface of the axial member and the bearing sleeve, when the axial member to be supported rotates; and
 a base member which fixes the housing,
 wherein the housing is a resin injection-molded article in which the base member is used as an insert part, and
 wherein the side portion and the bottom portion of the housing are integrally formed into a single unit.

2. The fluid bearing device according to claim 1, wherein a rotation stopper comprising one of a recessed portion and a salient portion is provided in the base member.

3. The fluid bearing device according to claim 1, wherein the bearing sleeve is used as another insert part.

4. The fluid bearing device according to claim 1, wherein a squareness between the base member and an axis of the housing is equal to or less than 20 µm, wherein the squareness defines a maximum value of a difference between a predetermined plane and a geometric line that is perpendicular relative to a reference line.

5. The fluid bearing device according to claim 1, wherein during rotation of the axial member, a dynamic pressure action of a lubricating oil is generated in the radial bearing gap.

6. The fluid bearing device according to claim 1, wherein the base member is a substrate.

7. A motor comprising:
 a rotor;
 a stator; and
 the fluid bearing device according to any one of claims 1-3, 4, 5 and 6, wherein the rotor is attached to the axial member of the fluid bearing device, and wherein the stator is attached to the housing of the fluid bearing device.

* * * * *